United States Patent
Bean et al.

(10) Patent No.: US 7,106,377 B2
(45) Date of Patent: Sep. 12, 2006

(54) IMAGE CAPTURING DEVICE CAPABLE OF SINGLE PIXEL EXPOSURE DURATION CONTROL

(75) Inventors: Heather Noel Bean, Fort Collins, CO (US); Mark Nelson Robins, Greeley, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 828 days.

(21) Appl. No.: 09/912,812

(22) Filed: Jul. 25, 2001

(65) Prior Publication Data

US 2003/0020827 A1 Jan. 30, 2003

(51) Int. Cl.
*H04N 5/238* (2006.01)
(52) U.S. Cl. .................................... 348/364
(58) Field of Classification Search .............. None
See application file for complete search history.

(56) References Cited

U.S. PATENT DOCUMENTS

| | | | |
|---|---|---|---|
| 4,154,505 A | 5/1979 | Kato et al. | |
| 4,516,032 A * | 5/1985 | Barr | 250/208.1 |
| 4,603,356 A * | 7/1986 | Bates | 348/294 |
| 4,716,427 A | 12/1987 | Shyu | 354/159 |
| 4,875,100 A | 10/1989 | Yonemoto et al. | |
| 4,917,452 A | 4/1990 | Liebowitz | |
| 4,935,820 A * | 6/1990 | Patel et al. | 349/2 |
| 5,029,989 A | 7/1991 | Phillips | |
| 5,030,985 A * | 7/1991 | Bryant | 348/296 |
| 5,053,875 A * | 10/1991 | Ishii et al. | 348/363 |
| 5,107,280 A | 4/1992 | Ohashi et al. | 346/108 |
| 5,140,428 A | 8/1992 | Park | |
| 5,193,016 A * | 3/1993 | Cornuejols | 349/25 |
| 5,337,106 A | 8/1994 | Jutamulia et al. | |
| 5,379,266 A | 1/1995 | Russell | |
| 5,479,227 A | 12/1995 | Matsumoto | 354/94 |
| 5,550,606 A | 8/1996 | Jansen et al. | 354/94 |
| 5,572,343 A | 11/1996 | Okamura et al. | |
| 5,585,847 A * | 12/1996 | Sayag | 348/269 |
| 5,649,250 A * | 7/1997 | Sasaki | 396/333 |
| 5,678,089 A | 10/1997 | Bacs et al. | |
| 5,781,333 A * | 7/1998 | Lanzillotta et al. | 359/316 |
| 5,808,588 A | 9/1998 | Lin | |
| 5,986,705 A * | 11/1999 | Shibuya et al. | 348/362 |
| 6,005,990 A | 12/1999 | Barrett et al. | |
| 6,026,053 A | 2/2000 | Satorius | |
| 6,075,952 A | 6/2000 | Baek et al. | 396/535 |
| 6,172,797 B1 | 1/2001 | Huibers | |
| 6,280,034 B1 | 8/2001 | Brennesholtz | |
| 6,577,821 B1 * | 6/2003 | Malloy Desormeaux | 348/333.11 |
| 2002/0012064 A1 * | 1/2002 | Yamaguchi | 348/362 |
| 2003/0011700 A1 | 1/2003 | Bean et al. | |
| 2003/0020958 A1 | 1/2003 | Bean et al. | |
| 2003/0052989 A1 | 3/2003 | Bean et al. | |
| 2005/0140820 A1 * | 6/2005 | Takeuchi et al. | 348/362 |

FOREIGN PATENT DOCUMENTS

| | | | |
|---|---|---|---|
| JP | 62245770 A | * | 10/1987 |
| WO | WO 92/11567 | * | 7/1992 |

* cited by examiner

*Primary Examiner*—Tuan Ho
*Assistant Examiner*—Jason Whipkey (57) ABSTRACT

A still image capturing device includes an image sensor comprising a plurality of pixel elements. An electronically actuatable shutter device includes a plurality of individually addressable and actuatable shutter elements. A shutter element substantially corresponds to one or more pixel elements. A memory stores an exposure threshold and one or more exposure patterns. A processor controls the plurality of shutter elements according to the exposure threshold or according to an exposure pattern.

12 Claims, 5 Drawing Sheets

IMAGE CAPTURING DEVICE CAPABLE OF SINGLE PIXEL EXPOSURE DURATION CONTROL

FIELD OF THE INVENTION

The present invention relates generally to image capturing devices, and more particularly to image capturing devices capable of single pixel exposure duration control.

BACKGROUND OF THE INVENTION

Still image capturing devices are used to visually memorialize scenes, events, or items. Still image capturing devices, such as digital cameras, include a lens, a shutter, and an image sensor, such as film or an electronic image sensor. In addition, most modern cameras include a processor and/or other control electronics that function to control shutter speed, aperture, flash, focus, etc.

The shutter and the image sensor are the main components of a still digital image capturing device and operate together in order to produce a digital image. In operation, the shutter is opened briefly to expose the image sensor and thereby form an image. The operation of the shutter is very important, and the quality of the captured image depends on a proper exposure time based on lighting, movement of the subject, focus distance, etc.

The original prior art shutter approach was a mechanical shutter. The mechanical shutter has been widely used for a number of years and is generally in the form of an iris-type shutter. However, the prior art mechanical shutter has many drawbacks, including weight, large size, susceptibility to dirt and wear, and the difficulty of precisely controlling shutter exposure times over a wide range of conditions. In addition, the mechanical shutter exposes the entire image essentially at once (disregarding the difference in exposure durations between the center of the image and the edges in an iris-type mechanical shutter). The prior art mechanical shutter cannot independently vary the exposure duration of a region of the image.

In some prior art cameras, the mechanical shutter is electronically activated by a motor or other electrical actuator. This may produce a more accurate shutter control, but consumes a lot of electrical power, is inflexible, and still exposes the entire film at once and for an essentially constant duration.

The prior art cannot expose individual pixel elements or different pixel regions for varying times. Such capability may be desirable due to the fact that illumination of a subject is rarely uniform, except perhaps in a studio setting.

Figure 1:
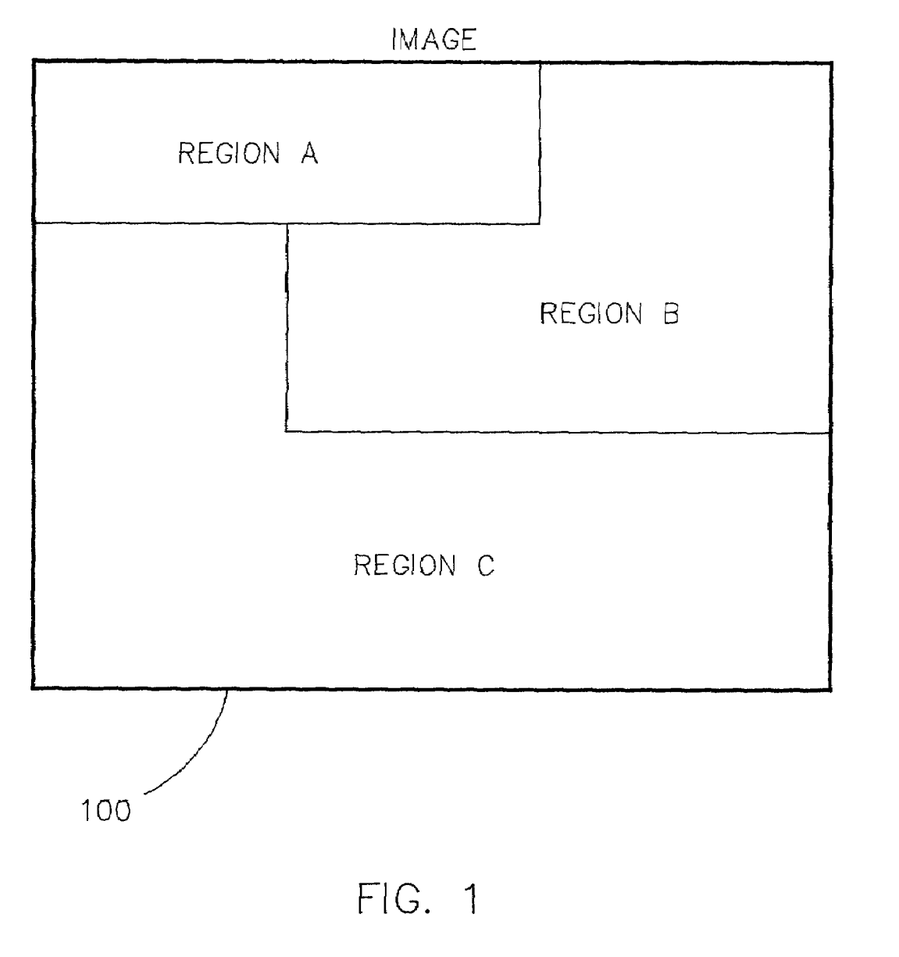
FIG. 1 shows an image that is subdivided into regions A, B, and C.

FIG. 1 shows an image 100 that is subdivided into regions A, B, and C. These regions may represent areas of differing image intensity. For example, region A may be a bright region, such as an area containing the sun in an outdoor scene, region B may be an area of a subject of medium light intensity such as a main subject of the image, and region C may be a darker foreground region. Region C may be the most difficult region to capture on an image, as the low light level may result in loss of image detail. In the prior art, these three regions are all treated equally, and are substantially uniformly exposed during an image capturing process. As a result, image capturing in the prior art often is less than satisfactory and may include regions of both over-exposure and under-exposure.

Therefore, there remains a need in the art for improvements in still image capturing devices.

SUMMARY OF THE INVENTION

A still image capturing device includes an image sensor comprising a plurality of pixel elements. An electronically actuatable shutter device comprises a plurality of individually addressable and actuatable shutter elements. A shutter element substantially corresponds to one or more pixel elements. A memory stores an exposure threshold and one or more exposure patterns. A processor controls the plurality of shutter elements according to the exposure threshold or according to an exposure pattern.

DETAILED DESCRIPTION

Figure 2:
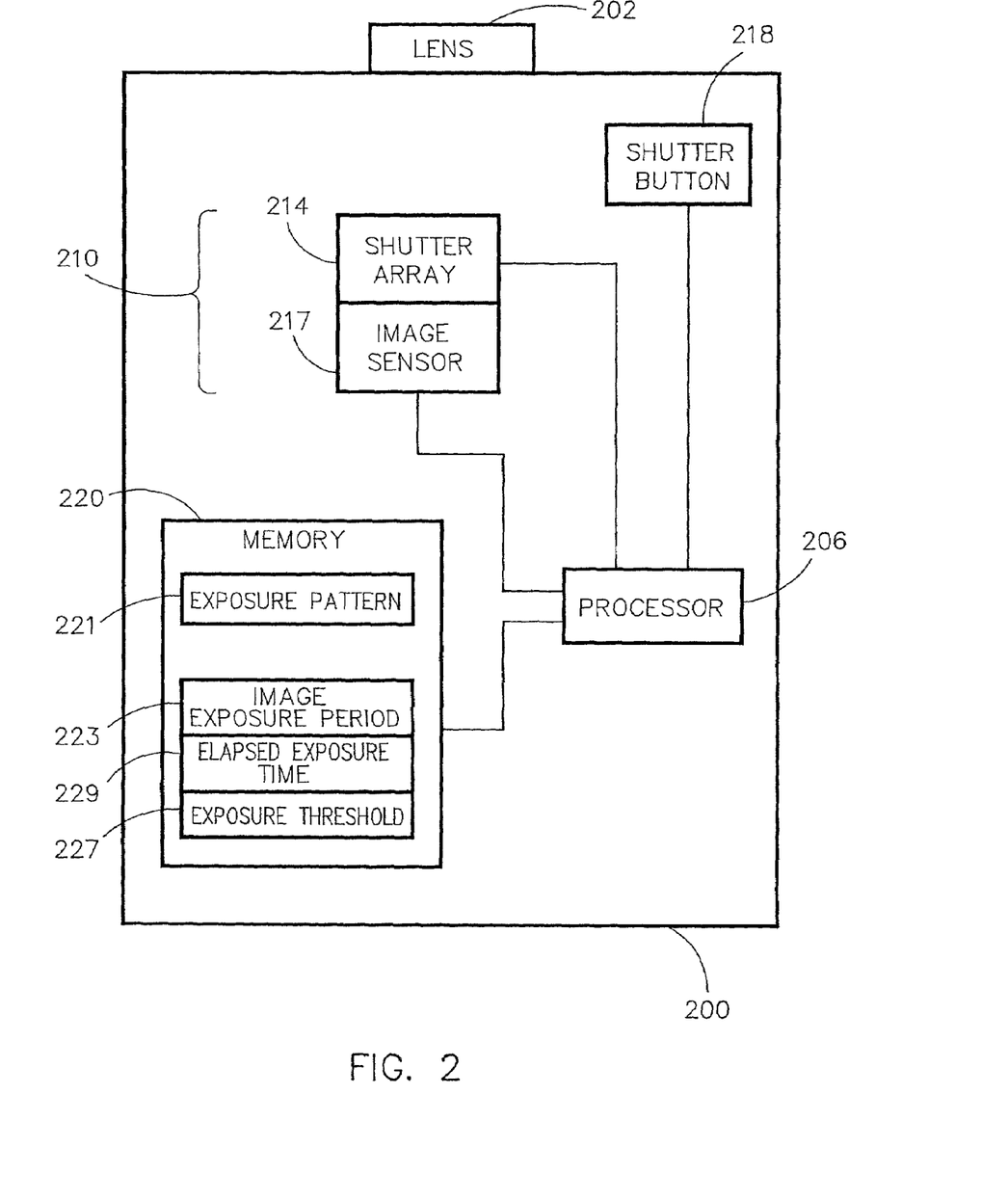
FIG. 2 is a block diagram of a still digital image capturing device according to one embodiment of the invention.

FIG. 2 is a block diagram of a still digital image capturing device 200 according to one embodiment of the invention. The image capturing device 200 includes a lens apparatus 202, a processor 206, a shutter array 214, an image sensor 217, a shutter button 218, and a memory 220.

Figure 3:
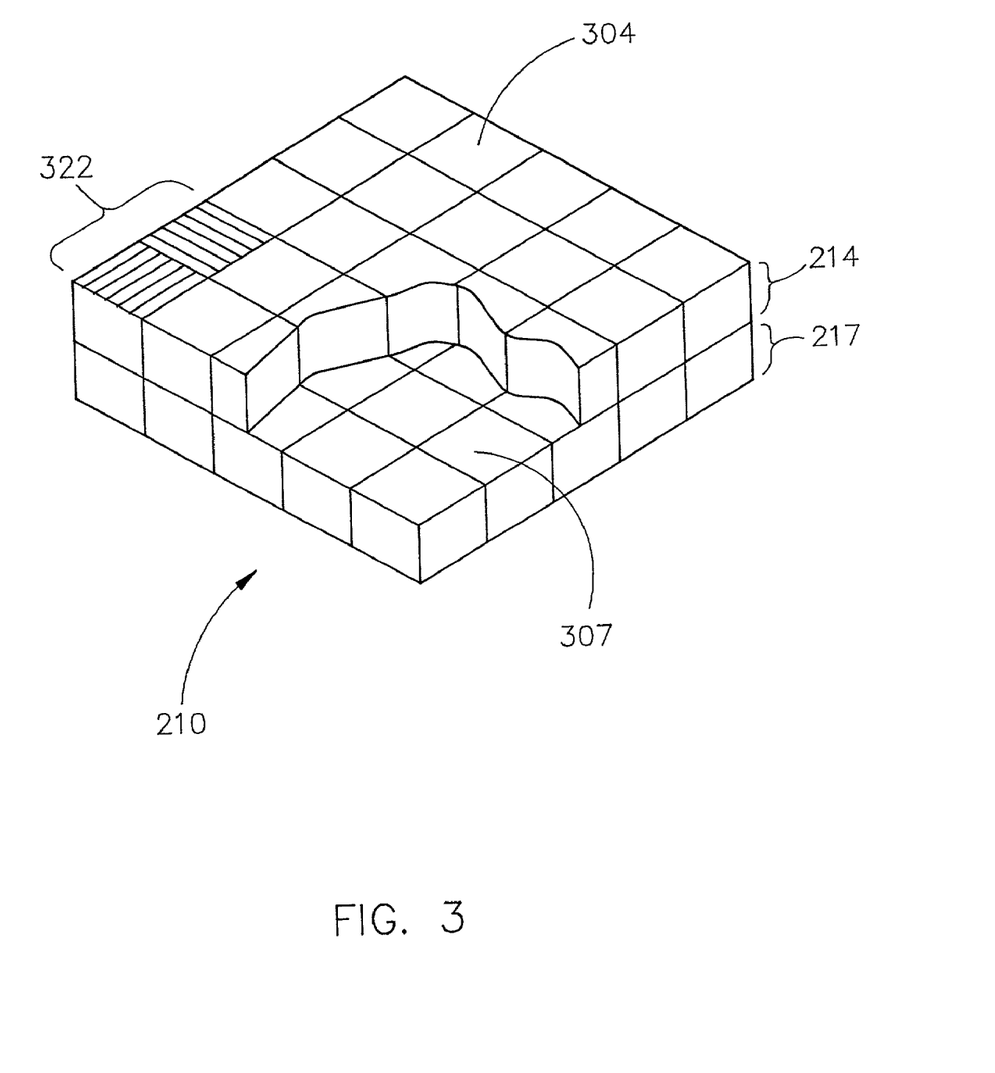
FIG. 3 shows detail of a shutter array and an electronic image sensor.

The shutter array 214 is electronically actuated and comprises a two dimensional array of individually addressable shutter elements (see FIG. 3 and accompanying discussion). The shutter array 214 is preferably a liquid crystal display (LCD) element comprising a two-dimensional array of individually addressable and actuatable shutter elements. Alternatively, the shutter array 214 may be a reflective microelectromechanical device comprising a two-dimensional array of electrically addressable and actuatable mechanical shutter elements.

In one embodiment, the image sensor 217 is film. In this embodiment, the image capturing device 200 may include a light sensor that is used to determine exposure times of pixels or regions of the image sensor 217. It should be noted that although the light-sensitive emulsion on photographic film is very fine and is capable of a very high resolution, the term pixel will be used for simplicity. As used herein, a pixel may refer to a region of film corresponding to a shutter element.

Alternatively, in another embodiment the image sensor 217 comprises an electronic image sensor 217. The shutter array 214 and the electronic image sensor 217 may comprise an imaging module 210. The image sensor 217 comprises a two-dimensional array of pixel elements. The image sensor 217 may be a CCD array or a CMOS array, for example. The pixel elements receive light through the shutter array 214 and generate an electronic signal related to the amount of light received. Therefore, the electronic signal increases over time as light is received by a particular pixel element. However, the particular pixel element may "saturate" at some point in the exposure if the exposure period continues for too long (i.e., over-exposure of the image may occur). As a result of saturation, the electronic signal will stop increasing. This is undesirable, as the dynamic range between pixel elements may be degraded and the image may lack detail and appear washed out. In addition, some regions of the image may not receive enough light. The resulting underexposure lacks detail.

The processor 206 may be any type of general purpose processor and may control the overall operation of the image capturing device 200. The processor 206 receives inputs from the shutter button 218 and controls a shuttering operation of the shutter array 214 in order to capture an image. In addition, in a digital still camera, the processor 206 controls the storage of digital images produced by the image sensor 217. For example, the processor 206 may receive images and store them in the memory 220. In addition, the processor 206 receives user inputs and performs functions specified by the user inputs.

In operation, the shutter array 214 is controlled by the processor 206 in response to a press of the shutter button 218. Incoming light enters the image capturing device 200 through the lens apparatus 202 and impinges upon shutter array 214. When activated by the processor 206, the shutter array 214 allows the incoming light to impinge on the image sensor 217, i.e., the shutter array 214 transforms from an opaque state to a light transmissive state. The shutter array 214 is controlled to be light transmissive for a predetermined exposure period, and is controlled to become light opaque at the end of the predetermined exposure period. Therefore, when the light passes through the shutter array 214 and impinges on the image sensor 217, an image may be captured by the image sensor 217.

The memory 220 may be any type of memory, including all types of random access memory (RAM), read-only memory (ROM), flash memory, magnetic storage media such as magnetic disc, tape, etc., or optical or bubble memory. The memory 220 may include, among other things, one or more exposure pattern storage cells 221, an image exposure period storage cell 223, an exposure threshold storage cell 227, and an elapsed exposure time storage cell 229. In addition, the memory 220 may store a software program to be executed by the processor 206.

The one or more exposure pattern storage cells 221 may store one or more exposure patterns. An exposure pattern stores two or more pixel unit exposure durations, where the pixel unit exposure durations are mapped to regions of an image sensor and may be used to control exposure durations of the regions. An exposure pattern therefore may specify groupings of pixel elements, with a grouping including an exposure time period. For example, the exposure pattern could specify a geometric pattern, such as a band, etc., that may be exposed for a longer or shorter time period than other regions of an image. Alternatively, the pattern may be a focus depth, for example, and any object within four to six feet from the image capturing device 200 may therefore be exposed for a longer or shorter time period than objects in front of or behind this particular focus depth band.

The image exposure period storage cell 223 may store a predetermined image exposure period. The predetermined image exposure period opens all shutter elements 304 (see FIG. 3) for a predetermined time duration. The predetermined image exposure period therefore may be analogous to a mechanical shutter opening time, and may be an optimum exposure time period of an image as a whole. As a consequence, the predetermined image exposure period may be employed to control the overall exposure duration, while a minimum or maximum exposure threshold may be employed to ensure proper exposure of all pixels.

The exposure threshold storage cell 227 may be used to store a minimum or maximum exposure threshold. The minimum or maximum exposure threshold may be user-settable and may be used to control exposure of any and all pixel elements 307 in the electronic image sensor 217 (see FIG. 3). The processor 206 may use the minimum or maximum exposure threshold to determine when an image capture for a particular pixel element or pixel element grouping may be stopped. For example, the processor 206 may compare a light level in a pixel element 307 (represented by a digital or analog electronic signal from the pixel element) to a minimum exposure threshold. If the electronic signal is not greater than the minimum exposure threshold, then the associated shutter element(s) 304 is left open and the exposure continues. However, if the electronic signal is greater than the minimum exposure threshold, then the associated shutter element(s) 304 is closed and exposure of the pixel element 307 is terminated. In this manner, the image exposure may be allowed to continue until a minimum exposure level is satisfied for all pixel elements. Likewise, a maximum exposure threshold may be used to close one or more shutter elements 304 when an exposure level exceeds the maximum exposure threshold.

The elapsed exposure time storage cell 229 may store an elapsed exposure time. The elapsed exposure time is the time that has elapsed since the initiation of an image capture, i.e., the time from when all shutter elements 304 were opened at the beginning of the image capture. The elapsed exposure time storage cell 229 therefore is an elapsed time counter. Alternatively, the elapsed time may be supplied by the processor 206.

FIG. 3 shows detail of the shutter array 214 and an electronic image sensor 217. A two-dimensional array of shutter elements 304 is formed on or assembled to a two-dimensional array of pixel elements 307. Therefore, in one embodiment a shutter element 304 may correspond substantially in size to a pixel element 307. Alternatively, in another embodiment the shutter element 304 may correspond in size to two or more pixel elements 307, allowing a shutter element 304 to shutter two or more pixel elements 307. Furthermore, the shutter array 214 is arranged so that the shutter elements 304 are substantially aligned with one or more corresponding pixel elements 307, and may operate to block or transmit light to the one or more corresponding pixel elements 307.

As previously discussed, the shutter array 214 may comprise an LCD element formed of a two-dimensional array of individually addressable and actuatable shutter elements 304. Therefore, the processor 206 may actuate one or more shutter elements 304, may actuate a pattern of shutter elements 304, or may actuate shutter elements 304 for differing periods of time. The shutter elements 304 may be actuated in any combination, and may be actuated according to a pattern or timetable. Consequently, the imaging module 210 according to the invention is capable of performing a pixel-by-pixel shuttering. The invention may expose small regions, even individual pixel elements, because the shutter array 214 may be formed on or assembled to the electronic image sensor 217. As a result, the shutter array 214 may control exposure of the pixel elements 307 without any significant shuttering overlap, light leakage, loss of focus, etc.

In one embodiment, the LCD element is a polymer dispersed liquid crystal (PDLC) element. The PDLC element may be used without polarizing filters. The PDLC element may be used regardless of the polarization effect, or alternatively a PDLC shutter array 214 may be formed of shutter elements having different polarization orientations in order to pass substantially non-polarized light, as discussed below.

In another embodiment, the LCD element is a nematic or super-twisted nematic LCD. In these types of LCD, both the incoming and outgoing sides of the LCD element include a polarizer, such as a polarizing film. Therefore, the image capture employs polarized light. The polarizing single LCD element configuration is the simplest and cheapest and may be optimal due to the dark "off" state. The polarizing single LCD element configuration may therefore still be preferable even though light is lost by having to pass through polarizing films.

It may be possible to negate the polarizing effect, however. For example, a pixel unit 322 may comprise a pair of shutter elements 304 and a pair of pixel elements 307. The paired pixel element configuration of the pixel unit 322 is desirable because of the polarization. Therefore, a pixel unit 322 according to the invention may include a shutter element of a first polarization orientation and a shutter element of a second polarization orientation. The second polarization orientation is substantially orthogonal to the first polarization orientation. As a result, the two pixel element polarizations are combined to capture substantially non-polarized light, and therefore the imaging module 210 as a unit may capture a substantially non-polarized image.

The polarizers in this embodiment may be formed of narrow bands of polarizing film material, with each pixel element of a pixel unit 322 being located in a separate polarization band (the pixel elements may be separated by a small distance). The bands may be formed having substantially perpendicular polarization orientations. Alternatively, each shutter element 304 may have a corresponding polarizing element that is deposited on or otherwise formed on the LCD element.

The above non-polarizing shutter may alternatively be implemented using two LCD elements, a beam splitter, and a beam combiner. The beam splitter splits the incoming light into two light beams and each beam is separately directed into one of the two LCD shutters. In this embodiment, the two LCD shutters polarize the light, and the two LCD shutters are positioned in substantially perpendicular polarization orientations. The polarized light from each shutter is then directed into the beam combiner, wherein the two substantially perpendicularly polarized light beams are combined to form a substantially non-polarized resultant light beam.

In an alternate embodiment, the shutter array 214 may comprise a two-dimensional array of individually addressable and actuatable reflective microelectromechanical shutter (MEMS) elements, as is known in the art. Unlike the prior art, however, the microelectromechanical elements are used as a reflective shutter, i.e., the MEMS device comprises actuatable mirror elements. The microelectromechanical elements may be actuated by an electric current to either direct light reflectively onto the image sensor 217 or scatter it to be absorbed by light-trapping material before coming into contact with the image sensor 217. As before, the actuation of the microelectromechanical elements is controlled by the processor 206 and may be controlled and actuated to selectively expose regions of the electronic image sensor 217.

Figure 4:
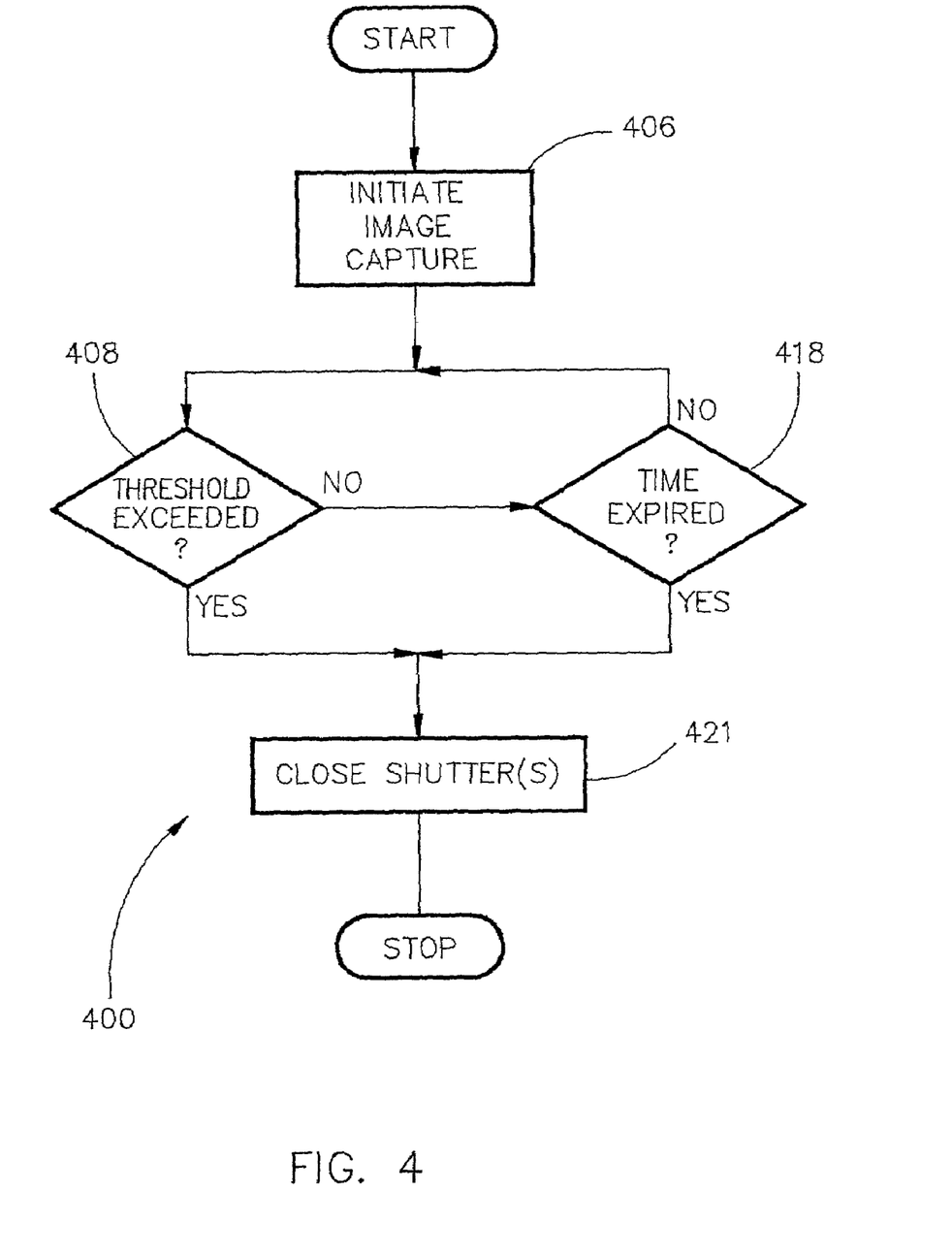
FIG. 4 is a flowchart of an image capturing method according to one embodiment of the invention.

FIG. 4 is a flowchart 400 of an image capturing method according to one embodiment of the invention. In step 406, the image capture is initiated. This is generally performed by pressing the shutter button 218. The initiation of the image capture causes all shutter elements 304 in the shutter array 214 to be opened or actuated to expose all pixel elements 307 of the image sensor 217.

In step 408, the intensity of a light signal from a particular pixel element 307 or pixel grouping is compared to an exposure threshold. The exposure threshold may be a minimum or maximum exposure threshold. The minimum exposure threshold is a minimum amount of light to be absorbed by a pixel element 307 of the image sensor 217 (i.e., the minimum exposure threshold determines how much light must be admitted into each pixel element 307 before exposure is terminated). The maximum exposure threshold is a maximum amount of light to be absorbed by a pixel element 307. If the intensity is less than or equal to the exposure threshold, then the method proceeds to step 418, otherwise it proceeds to step 421.

The comparison may be done for each pixel element 307 in the image sensor 217. Alternatively, the comparison may be done for groupings, such as rows, columns, or for predetermined blocks of pixel elements. In addition, geometric exposure regions may be set up beforehand by the user. One such region may be a focus region. For example, according to a focus region, all objects within four to six feet may have a first exposure threshold and all other objects may have a second exposure threshold. In addition, the user may specify certain geometric shapes or regions (i.e., objects), such as figures, persons, etc.

In step 418, an elapsed image exposure time is compared to a predetermined image exposure period. If the predetermined image exposure period has expired (i.e., the elapsed image exposure time is greater than the predetermined image exposure period), then the method proceeds to step 421, otherwise it loops back to step 408.

In step 421, the shutter element 304 corresponding to the particular pixel element 307 is closed. Therefore, during image capture a pixel element or grouping may be exposed until the light intensity meets the exposure threshold, but the exposure is limited to the predetermined image exposure period. As a result, a pixel element or grouping may be open while other pixels or groupings have their corresponding shutter elements closed. Therefore, the exposure threshold determines how much light must be admitted into each pixel element 307 for exposure to be terminated.

It should be understood that the method may be iterative and may be done for all pixel elements 307 of the image sensor 217. Alternatively, blocks or groupings of pixel elements 307 may be shuttered in accordance along with a representative pixel element, such as a middle pixel element. This may cut down on the processing time needed for comparing the pixel elements to the exposure threshold, and yet allows a high level of exposure control for the still digital image capturing device 200.

Figure 5:
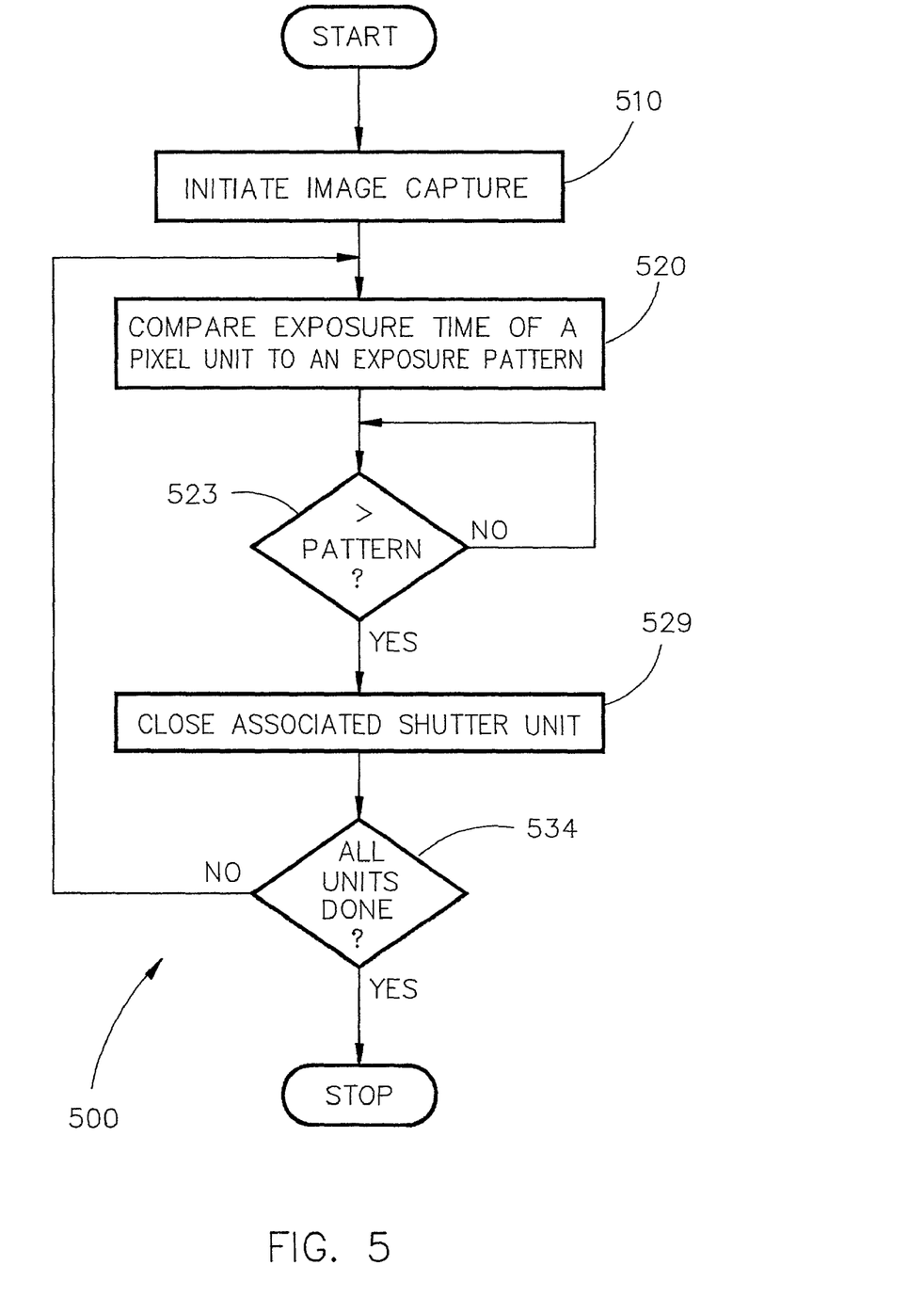
FIG. 5 is a flowchart of an image capturing method according to another embodiment of the invention.

FIG. 5 is a flowchart 500 of an image capturing method according to another embodiment of the invention. In step 510, an image capture is initiated. This includes opening all shutter elements 304 of the shutter array 214.

In image sensors where individual pixel elements cannot be read or sampled during image acquisition exposure (such as a CCD array), a sampled pre-exposure may be used to automatically set exposure times for regions of low light. For example, the shutter array 214 may be briefly opened prior to image capture. As a result, the image sensor 217 may sample light levels for pixel elements or groupings of pixel elements. The measured light levels from the sampling may be compared to one or more predetermined minimum light levels, and the comparison may be used to generate an exposure pattern and to generate an exposure period time value. In this manner, the image capturing device 200 may use the pre-exposure sampling to generate an exposure pattern that includes regions of different pixel unit exposure durations in order to handle regions of differing brightness.

The pre-exposure sampling may be used to subdivide the pixel elements 307 into a plurality of pixel units. A pixel unit is defined as one or more pixel elements 307 that share a common exposure duration (i.e., a region as in FIG. 1). The pixel unit exposure duration may be one of many stored in the memory 220 as part of an exposure pattern. The exposure pattern therefore dictates exposure durations for regions of the image.

FIG. 1 shows an exemplary exposure pattern, wherein region A may have a first exposure duration region, B may have a second exposure duration, and region C may have a third exposure duration. If region A is the brightest region and region C is the darkest, then logically the exposure duration of region A would be the shortest and the exposure duration of region C would be the longest. These regions therefore may be used to subdivide the pixel elements and the corresponding shutter elements into pixel units and shutter units. The pixel and shutter units may contain any number of pixel and shutter elements.

Referring again to FIG. 5, in step 520 the elapsed exposure time for a pixel unit (and shutter unit) is compared to a pixel unit exposure duration.

In step 523, if the elapsed exposure time is less than the pixel unit exposure duration, the method loops back on itself and waits. Otherwise the exposure for the region and pixel unit is complete, and the method proceeds to step 529.

In step 529, all shutter elements 304 of the shutter unit associated with the particular pixel unit are closed.

In step 534, if all pixel and shutter units (i.e., image regions) have been processed, the method exits, otherwise it branches back to step 520 and the next pixel and shutter unit is processed. In this regard, it is noted that the comparison step 520 will operate on the various pixel units according to the predefined exposure pattern (i.e., pixel units with the shortest exposure time will be compared first).

We claim:

1. A still image capturing device, comprising:
an electronic image sensor including a plurality of pixel elements;
a lens for focusing light from a scene onto said image sensor;
an electronically actuatable shutter device positioned between said lens and said image sensor, including a plurality of individually addressable and actuatable shutter elements, with a shutter element of said plurality of individually addressable shutter elements substantially corresponding to at least one of said plurality of pixel elements;
a memory;
a processor communicating with said image sensor, with said shutter device, and with said memory, said processor being configured to control said plurality of shutter elements according to an exposure pattern stored in said memory, whereby different shutter elements of said shutter device may be light transmissive for different lengths of time, and thereby exposing corresponding pixel elements of said image sensor to focused light from said lens for different lengths of time, and said processor being configured to automatically generate said exposure pattern prior to capturing an image by controlling the shutter device to expose at least a first and second subset of the plurality of pixel elements to light for a duration of time and measuring the level of light reaching the first and second subsets of pixel elements, wherein the exposure pattern comprises a first pixel unit exposure duration and a second pixel unit exposure duration, said first pixel unit exposure duration being associated with the first subset of said plurality of pixel elements, said second pixel unit exposure duration being associated with the second subset of said plurality of pixel elements, said first pixel unit exposure duration being longer than said second pixel unit exposure duration, and said second pixel unit exposure duration being greater than zero seconds.

2. The apparatus of claim 1, wherein said shutter device comprises a liquid crystal display (LCD) shutter element comprising a two-dimensional array of individually addressable and actuatable shutter elements.

3. The apparatus of claim 1, wherein said shutter device comprises a microelectromechanical shutter element comprising a two-dimensional array of individually addressable and actuatable shutter elements.

4. The apparatus of claim 1, further comprising a shutter button, wherein said processor is configured to use a pre-exposure sampling to generate the exposure pattern.

5. The apparatus of claim 1, wherein said processor is configured to compare said measured level of light to a predetermined minimum light level.

6. The apparatus of claim 1, wherein said electronic image sensor is a CCD sensor or a CMOS sensor.

7. The apparatus of claim 1, wherein, in response to activation of a shutter button, the processor is configured to control the shutter device to expose to light (1) the first subset of pixel elements for an amount of time not greater than the first pixel unit exposure duration and (2) the second subset of pixel elements for an amount of time not greater than the second pixel unit exposure duration.

8. An image capturing device, comprising:
an electronic image sensor including a plurality of pixel elements;
an electronically actuatable shutter device positioned adjacent to said image sensor, including a plurality of individually addressable and actuatable shutter elements;
a memory storing an exposure threshold;
a shutter button;
a processor communicating with said image sensor, said shutter device, said memory, and said shutter button, said processor being configured such that in response to activation of the shutter button, the processor (1) controls the shutter device so that all of the shutter elements are light transmissive, (2) monitors at least a subset of the plurality of pixel elements to detect whether the intensity of a light signal from the subset exceeds the exposure threshold, and (3) in response to detecting that the intensity of the light signal exceeds the threshold, controls the shutter device so that the shutter elements corresponding to the subset become non-light transmissive.

9. The image capturing device of claim 8, wherein said shutter device comprises a liquid crystal display (LCD) shutter element comprising a two-dimensional array of individually addressable and actuatable shutter elements.

10. The image capturing device of claim 8, wherein said shutter device comprises a microelectromechanical shutter element comprising a two-dimensional array of individually addressable and actuatable shutter elements.

11. The image capturing device of claim 8, wherein said electronic image sensor is a CCD sensor or a CMOS sensor.

12. The image capturing device of claim 8, wherein said subset of pixel elements a predetermined pixel element or group of pixel elements.

* * * * *

UNITED STATES PATENT AND TRADEMARK OFFICE
CERTIFICATE OF CORRECTION

| | | |
|---|---|---|
| PATENT NO. | : 7,106,377 B2 | Page 1 of 1 |
| APPLICATION NO. | : 09/912812 | |
| DATED | : September 12, 2006 | |
| INVENTOR(S) | : Heather Noel Bean et al. | |

It is certified that error appears in the above-identified patent and that said Letters Patent is hereby corrected as shown below:

In column 8, line 63, in Claim 12, after "elements" insert -- is --.

Signed and Sealed this

Fifth Day of May, 2009

JOHN DOLL
*Acting Director of the United States Patent and Trademark Office*